United States Patent
Fodor et al.

(10) Patent No.: US 7,003,264 B2
(45) Date of Patent: Feb. 21, 2006

(54) SYSTEM AND METHODS FOR COMPARING DATA QUALITY FOR MULTIPLE WIRELESS COMMUNICATION NETWORKS

(75) Inventors: Kevin Fodor, Chicago, IL (US); Robert Grom, Palatine, IL (US); Rishi Bharadwaj, DesPlaines, IL (US)

(73) Assignee: Agilent Technologies, Inc., Palo Alto, CA (US)

( * ) Notice: Subject to any disclaimer, the term of this patent is extended or adjusted under 35 U.S.C. 154(b) by 672 days.

(21) Appl. No.: 09/794,606

(22) Filed: Feb. 27, 2001

(65) Prior Publication Data

US 2002/0155831 A1 Oct. 24, 2002

(51) Int. Cl.
*H04B 17/00* (2006.01)
*G01S 3/02* (2006.01)

(52) U.S. Cl. .................................... 455/67.11; 342/457
(58) Field of Classification Search ............. 455/426.1, 455/67.11, 426, 67.1; 342/457
See application file for complete search history.

(56) References Cited

U.S. PATENT DOCUMENTS

| | | | |
|---|---|---|---|
| 5,398,276 A | 3/1995 | Lemke et al. | |
| 5,481,588 A | 1/1996 | Rickli et al. | |
| 5,528,518 A | 6/1996 | Bradshaw et al. | |
| 5,781,156 A | 7/1998 | Krasner | |
| 5,825,327 A | 10/1998 | Krasner | |
| 5,831,574 A | 11/1998 | Krasner | |
| 5,841,396 A | 11/1998 | Krasner | |
| 5,874,914 A | 2/1999 | Krasner | |
| 5,884,214 A | 3/1999 | Krasner | |
| 5,945,944 A | 8/1999 | Krasner | |
| 5,945,949 A * | 8/1999 | Yun | 342/457 |
| 6,169,896 B1 | 1/2001 | Sant et al. | |
| 2002/0155816 A1 * | 10/2002 | Fodor et al. | 455/67.1 |

FOREIGN PATENT DOCUMENTS

| | | |
|---|---|---|
| GB | 2 320 658 | 6/1998 |
| GB | 2 360 173 | 9/2001 |
| WO | WO 93/15569 | 8/1993 |

OTHER PUBLICATIONS

GB02052163.2 Jul. 16, 2002 U.K. Search Report.

* cited by examiner

*Primary Examiner*—William D. Cumming

(57) ABSTRACT

Systems and methods for comparing data quality for multiple wireless communication networks are provided. One such method comprises: obtaining information related to a location of a first mobile wireless device associated with the first wireless data network and a second mobile wireless device associated wish the second wireless data network; establishing a first data call between the first mobile wireless device and the first wireless data network and a second data call between the second mobile wireless device and the second wireless data network, the first and second data calls based on a predefined testing scenario; obtaining information related to the quality of data service associated with the first and second data calls; and correlating the information related to the quality of data service associated with the first and second data calls with the information related to the location of the first and second mobile wireless devices.

42 Claims, 14 Drawing Sheets

SYSTEM AND METHODS FOR COMPARING DATA QUALITY FOR MULTIPLE WIRELESS COMMUNICATION NETWORKS

TECHNICAL FIELD

The present invention is generally related to wireless communication systems, and more particularly, is related to systems and methods for measuring data quality in wireless communication systems.

BACKGROUND OF THE INVENTION

Wireless communication systems have become increasingly prevalent in today's society. Such systems enable mobile users to travel freely within the service area of the network and communicate via a wireless communication device with telephones, facsimile devices, computers, e-mail subscribers, other wireless communication devices and any of a number of other computer-based devices that support wireless communication.

The current landscape of wireless communication includes a multitude of wireless communication services based on different technologies and offering different features to mobile users. For instance, analog advanced mobile phone services (AMPS), which were implemented in the 1980's, provide basic calling and voice mail. Digital advanced mobile phone service (D-AMPS) provide advanced features such as caller identification and paging. D-AMPS uses multiplexing techniques such as time division multiple access (TDMA) and code division multiple access (CDMA) to give wireless carriers more capacity on existing channels. Other services, such as global system for mobile communications (GSM) and personal communications service (PCS), offer similar features. More advanced wireless communication services, such as cellular digital packet data (CDPD), specialized mobile radio (SMR), wideband CDMA (WCDMA), general packet radio service (GPRS), services based on wireless access protocol (WAP), Internet protocol (IP), file transfer protocol (FTP), hyper text transfer protocol (HTTP) and other known data communication protocols, and other "second generation" (2G) and "third generation" (3G) services provide numerous types of wireless data communication services. For example, these advanced wireless data communication services enable mobile users to access data from numerous sources via public or private packet-switched or other data networks including the Internet, circuit switched networks such as the public switched telephone network, or other wireless networks.

The complex mixture of different wireless communication technologies and different wireless devices makes evaluating the data performance of data networks a very difficult task. Measuring the data service quality, as opposed to voice quality, of a wireless network is particularly problematic. For instance, when transmitting voice over a wireless network, the wireless network may still support voice in areas within a cell, such as within buildings or where terrain or other factors are a problem, where the signal to noise ratio is limiting. In order to continue voice service, the wireless network reduces the information capacity of the voice signal so that it may still be carried over the voice channel. In such instances, although there may be reduced voice quality, the mobile user may still be able to discern what is being said. However, when transmitting raw data over a wireless network, reducing the information capacity of the data signal to accommodate areas with a poor signal to noise ratio effects the content of the data being transmitted. Thus, there are many locations within a wireless data network where voice service may be provided adequately, but where the quality of data service would be unacceptable to mobile users.

One current approach to approximating the quality of data service in a wireless data network involves using simulation and planning techniques. This approach is very problematic because it is not based on actual network measurements, but instead relies on theoretical assumptions about how engineering parameters actually relate to the quality of data service as perceived by mobile users. This approximation also does not take into account non-predictive measurements such as call setup times and server delays or errors that also decrease the user's perceived quality of service.

Another current approach to measuring the quality of data service in a wireless data network involves manually initiating data calls using standard modem utilities at discrete positions within a wireless data network and measuring the quality of data service at each position. However, this approach is very problematic. In order to develop an effective "data footprint" of a wireless data network, thousands of individual tests must be run. Furthermore, separate tests and measurements must be run for each wireless data network being tested and the locations of the tests need to be individually hand mapped with the collected data. The data collected by this approach is usually input into a spreadsheet for additional analysis, which may introduce errors in the measurements. This manual approach is very time-consuming and consequently very costly.

Thus, a heretofore unaddressed need exists in the industry to address the aforementioned deficiencies and inadequacies.

SUMMARY OF THE INVENTION

The present invention provides systems and methods for comparing data quality for multiple wireless communication networks.

Briefly described, in architecture, one of many possible implementations of a system for comparing the data performance a first wireless network to the data performance of a second wireless network according to the present invention comprises a means for obtaining information related to a location of a first mobile wireless device associated with the first wireless data network and a second mobile wireless device associated with the second wireless data network, a means for establishing a first data call between the first mobile wireless device and the first wireless data network and a second data call between the second mobile wireless device and the second wireless data network, the first and second data calls based on a predefined testing scenario, a means for obtaining information related to the quality of data service associated with the first and second data calls, and a means for correlating the information related to the quality of data service associated with the first and second data calls with the information related to the location of the first and second mobile wireless devices. The system may further comprise a means for obtaining information corresponding to the electromagnetic signals associated with the first and second data calls, a means for correlating the information corresponding to the electromagnetic signals with the information related to the location of the first and second mobile wireless devices, a means for comparing the correlated information related to the quality of data service associated with the first data call with the correlated information related to the quality of data service associated with the second data call, a means for storing the information related to the quality of data service associated with the first and second data calls, the information related to the location of the first and second mobile wireless devices, and the information corresponding to the correlation of the information related to the quality of data service associated with the first and second data calls with the information related to the location of the first and second mobile wireless devices, and a means for providing access to the stored information.

The present invention can also be viewed as providing one or more methods for comparing the data performance a first wireless network to the data performance of a second wireless network. Briefly, one such method involves the steps of: obtaining information related to a location of a first mobile wireless device associated with the first wireless data network and a second mobile wireless device associated with the second wireless data network, establishing a first data call between the first mobile wireless device and the first wireless data network and a second data call between the second mobile wireless device and the second wireless data network, the first and second data calls based on a predefined testing scenario, obtaining information related to the quality of data service associated with the first and second data calls, and correlating the information related to the quality of data service associated with the first and second data calls with the information related to the location of the first and second mobile wireless devices. The method may further comprise the following steps: comparing the correlated information related to the quality of data service associated with the first data call with the correlated information related to the quality of data service associated with the second data call; storing the information related to the quality of data service associated with the first and second data calls, the information related to the location of the first and second mobile wireless devices, and the information corresponding to the correlation of the information related to the quality of data service associated with the first and second data calls with the information related to the location of the first and second mobile wireless devices; providing access to the stored information. The method may further comprise the steps of: comparing the correlated information related to the quality of data service associated with the first data call with the correlated information related to the quality of data service associated with the second data call; providing access to the comparison information; and receiving payment for providing the comparison information.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 16 is a wireless device display screen generated by a preferred embodiment of the automated wireless data quality measurement system of FIGS. 1–3 and displayed on a preferred embodiment of the user interface of FIG. 3.

FIG. 17 is a data call statistics table display screen generated by a preferred embodiment of the automated wireless data quality measurement system of FIGS. 1–3 and displayed on a preferred embodiment of the user interface of FIG. 3.

DETAILED DESCRIPTION OF THE PREFERRED EMBODIMENT

I. System Overview

Figure 1:
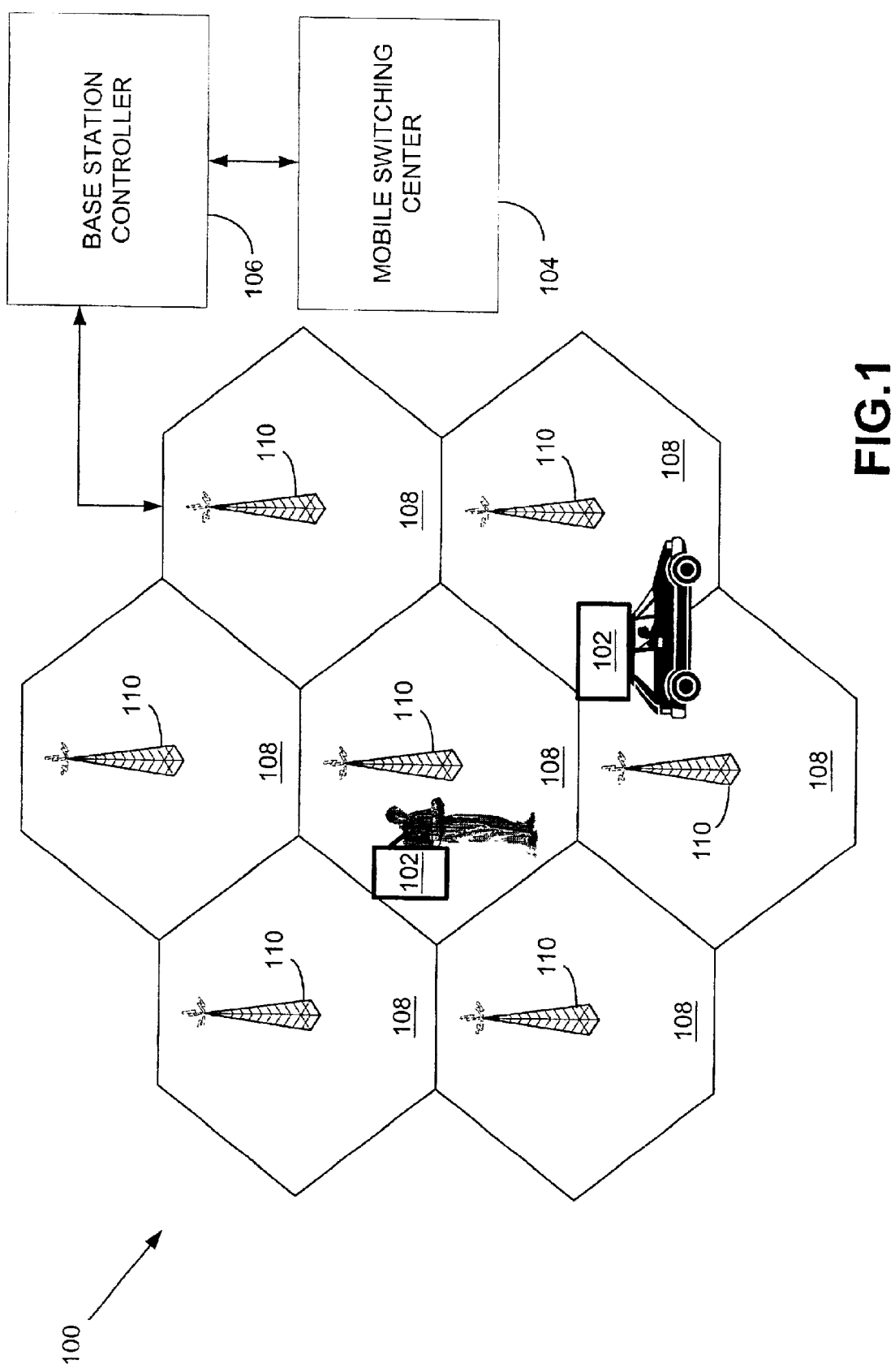
FIG. 1 is a block diagram illustrating a cell cluster of a wireless data network in which one of a number of possible embodiments of an automated wireless data quality measurement system in accordance with the present invention may be employed.

FIG. 1 is a block diagram illustrating a cell cluster of a wireless data network 100 in which one of a number of potential embodiments of an automated wireless data quality measurement system 102 in accordance with the present invention is employed. As known in the art, wireless data network 100 generally comprises a mobile switching center 104, a base station controller 106, geographic regions, commonly referred to as cells, 108, and radio transceivers 110. Cells 108 are positioned adjacent to each other and in a pattern defining the area to which wireless data network 100 provides data communication services. Each cell 108 has a radio transceiver 108 located near the center of the cell 108 for communicating with automated wireless data quality measurement system 102 while it is located in the cell 108. A collection of cells 108, which is commonly referred to as a cell cluster, is connected to mobile switching center 104 by base station controller 106 for the purpose of communicating data to and receiving data from automated wireless data quality measurement system 102 while it is moving throughout cells 108 in the cell cluster of wireless data network 100. As described in more detail below and as shown in FIG. 1, automated wireless data quality measurement system 102 may be coupled to an individual via a portable carrying device, such as, for example, a field pack or may be coupled to a motor vehicle.

Figure 2:
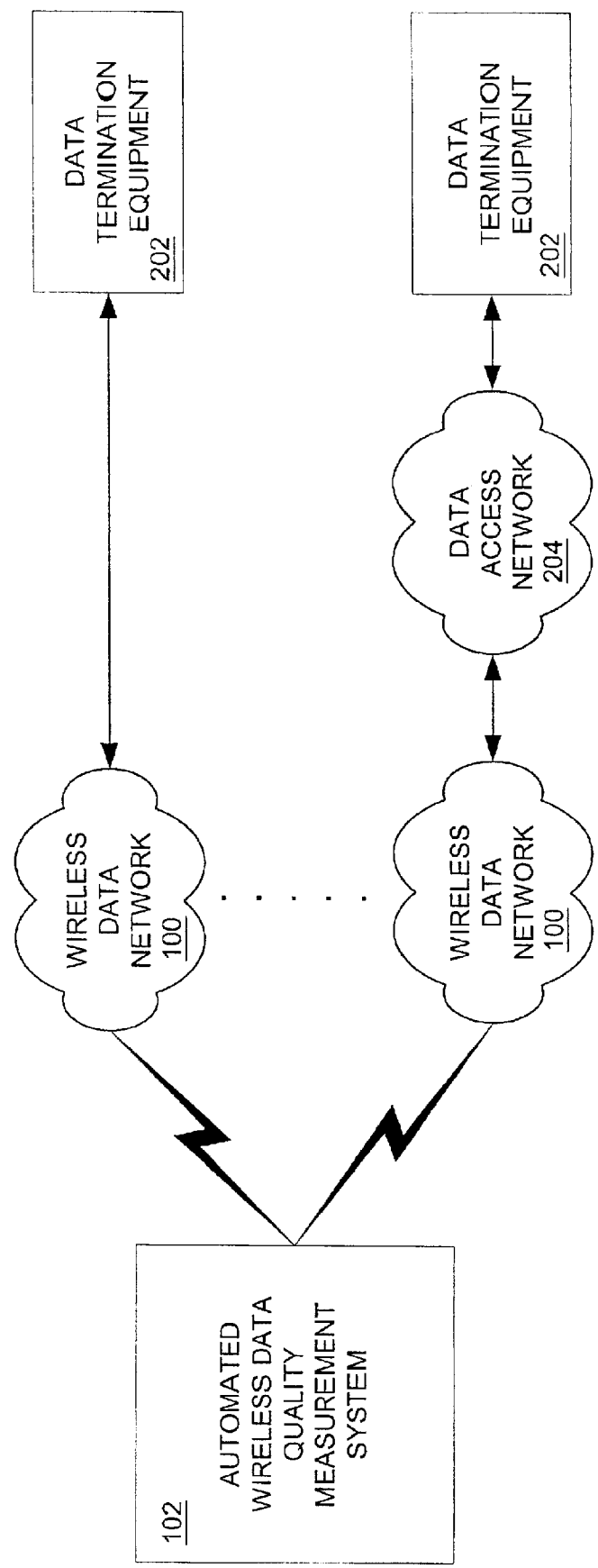
FIG. 2 is a block diagram illustrating the data communication process involving the automated wireless data quality measurement system of FIG. 1.

FIG. 2 illustrates the data communication process involving automated wireless data quality measurement system 102 and wireless data network 100 of FIG. 1. Automated wireless data quality measurement system 102 may engage in a data call with data termination equipment 202 in two general ways. First, automated wireless data quality measurement system 102 may establish data communication with data termination equipment 202 also located within wireless data network 100. Automated wireless data quality measurement system 102 may also establish a data call with data termination equipment 202 located outside wireless data network 100. In such instances, the data call is maintained over a data access network 204 in communication with wireless data network 100.

Wireless data network 100 may be any radio communication system which supports data communication. Non-limiting examples of such systems include the following: North American advanced mobile phone service (AMPS), global system for mobile communications (GSM), Japanese mobile communication systems (MCS), Scandinavian nordic mobile telephone (system) (NMT), British total access communication system (TACS), code division multiple access (CDMA) based system, including CDMA2000, time division multiple access (TDMA), wideband CDMA (WCDMA), personal communication networks (PCN), Integrated Dispatch Enhanced Network (iDEN), personal communications service (PCS), cellular digital packet data (CDPD), general packet radio service (GPRS), wireless access protocol (WAP) systems, specialized mobile radio (SMR), second generation (2G) systems, third generation (3G) systems, or similar predecessor or successor system, or any other radio communication system supporting data communications.

II. System Components

Figure 3:
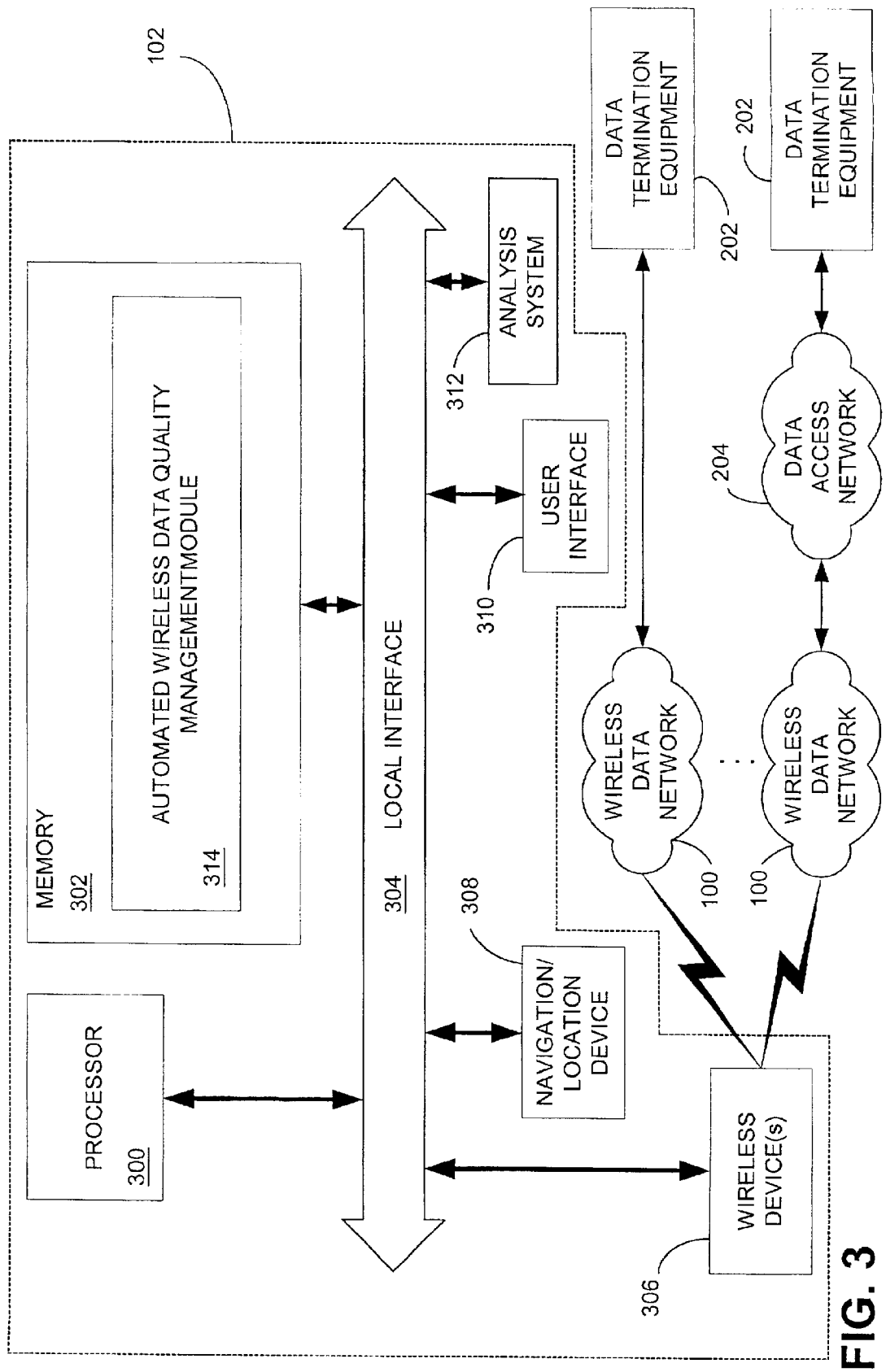
FIG. 3 is a block diagram illustrating the components of the automated wireless data quality measurement system of FIGS. 1 and 2.

FIG. 3 is a more detailed block diagram illustrating automated wireless data quality measurement system 102 of FIGS. 1 and 2. Automated wireless data quality measurement system 102 generally comprises a processor 300, memory 302, a local interface 304, wireless devices 306, a navigation, or location, system 308, a user interface 310, and a data analysis system 312. Memory 302 comprises an automated wireless data quality measurement module 314, which may be accessed via local interface 304 by processor 300. Processor 300 may also communicate with wireless devices 306, navigation system 308, user interface 310, and data analysis system 312.

Wireless device 306 may be a wireless telephone, a wireless personal digital assistant (PDA), a pager, a vehicle tracking system, or any other future or known device capable of engaging in wireless data communications.

Navigation system 308 may be any device or system capable of determining its three-dimensional position (either absolute or relative), velocity, and/or acceleration around the world or at least within the service area of wireless data network 100. For example, navigation system 308 may be a global positioning system (GPS) or any other similar navigation system such as those known in the art, including systems such as those described in the following: U.S. Pat. Nos. 5,781,156, 5,831,574, 5,884,214, 5,825,327, 5,945,944, 5,874,914, and 5,841,396 to Krasner, all of which are hereby incorporated by reference in their entirety. Navigation system 308 may also be configured to determine position information in areas where traditional navigation systems cannot be used, such as, for example, in buildings. For instance, navigation system 308 may configured in a manner similar to the system described in U.S. Pat. No. 5,528,518 to Bradshaw et al., which is hereby incorporated by reference in its entirety. In a preferred embodiment, navigation system 308 may be configured in a manner similar to the system described in U.S. Pat. No. 5,398,276 to Lemke.

Navigation system 308 may include a user interface, which may be incorporated with user interface 310, that illustrates a bitmap floor plan overlaid with radio frequency (RF) data. In this embodiment, navigation is a matter of clicking on the floor plan to define the route taken. Floor plan maps may be created using any graphics package, but if a plan is not defined, "paced" navigation may be enabled. In this mode, bearings are entered in order to define the direction of travel, and distance is measured using counted paces.

In alternative embodiments, navigation system 308 may also support GPS navigation data with dead reckoning, which is known in the art. For example, navigation system 308 may include a combination of wheel sensors, a gyro, and custom software to fill in areas where GPS is not available by making certain assumptions about direction and speed. In additional embodiments, navigation system 308 provides GPS and a self-calibrating dead reckoning system that simplifies configuration. It may also provide map matching capabilities, which allow navigation system 308 to adjust for minor positional inaccuracies created by the GPS network. Based on information about the position of roads recorded on a special map CD-ROM, it will adjust navigation data recorded by navigation system 308 to make sure the recorded information shows the vehicle on the road, not five or ten meters off the road. In still further embodiments, navigation system 308 may be configured as a proprietary navigation system using standard GPS receivers and the TAIP protocol or the NMEA 0183 format. All of these navigation systems not only record the referenced position of the measurements, but they also collect information including the altitude of the measurement, and the speed and heading of the vehicle. In locations where CD-ROM based maps are not available, the positional information can be augmented with visual maps produced from scanned street maps of building floor-plans, or a variety of other commercially available digital maps. User interface 310 may be any standard user interface as is known in the art. For example, user interface 310 may be a portable computer, a handheld computer, or any other computer-based system for interacting with processor 300 and automated wireless data quality measurement module 314 in memory 302. As stated above, in alternative embodiments, user interface 310 may communicate with navigation system 308 or data analysis system 312. As described in detail below, user interface 310 may be used to enable a user of automated wireless data quality measurement system 102 to configure automated wireless data quality measurement module 314. In alternative embodiments, user interface 310 maybe absent, in which case the functionality of automated wireless data quality measurement module 314 described below is predefined..

Data analysis system 312 may be any computer-based system for analyzing the data collected by wireless devices 306 and navigation system 308. For example, as described in more detail below, automated wireless data quality measurement system 102 may obtain information related to the position of a wireless device 306 located within wireless data network 100. After automated wireless data quality measurement system 102 establishes a data call between wireless device 306 and wireless data network 100, information related to the quality of data service (and information related to the electromagnetic, or RF, signal) associated with the data call may also be obtained. Automated wireless data quality measurement system 102 may also correlate the information related to the quality of data service associated with the data call with the information received from navigation system 308. In some embodiments, automated wireless data quality measurement system 102 may not include data analysis system 312. In these embodiments, all the information is stored in memory 302 or in a separate database (not shown) and analysis of the information occurs externally to automated wireless data quality measurement system 102. For example, access to the database may be provided. Alternatively, the information contained in the database may be provided directly to an external data analysis system. In alternative embodiments, automated wireless data quality measurement system 102 may be include data analysis system 312.

Automated wireless data quality measurement module 314 may be implemented in hardware, software, firmware, or a combination thereof. As illustrated in FIG. 3, in one of a number of potential embodiments, automated wireless data quality measurement module 314 is implemented in software or firmware that is stored in memory 302 and that is executed by processor 300 or any other suitable instruction execution system. If implemented in hardware, as in an alternative embodiment, automated wireless data quality measurement module 314 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

III. Operation of System

As described above, in one of a number of possible embodiments, automated wireless data quality measurement system 102 may be used to measure the performance of a single wireless data network 102. In general, automated wireless data quality measurement system 102 automatically tests the quality of a data call between a wireless device 306 and a wireless data network 100. The quality of the data call is tested in terms of how a mobile subscriber operating the wireless device 306 perceives it. For example, a mobile subscriber is typically only concerned with such things as the amount of time required to place a data call, the number of data calls that go through on the first attempt, the frequency of lost connections, the length of the data call, the number of data errors encountered in a data call, and the effect of data calls on voice quality, to name a few. Automated wireless data quality measurement system 102 measures the quality of the wireless data network 100 by establishing a data call between wireless device 306 and wireless data network 100. The characteristics of the data call may be predefined or configured via user interface 310. Whether configured based on information received via user interface 310 or predefined in memory 302, the characteristics of the data call may be varied depending on a variety of factors, such as, for example, the type of wireless device 306 being used, the type of wireless data network 100 being tested, the requirements of the particular user, or any other factor of interest to users measuring the performance of wireless data networks 100. For illustrative purposes only, the data call may involve any of the following: data messaging within or outside wireless data network 100, web browsing within or outside wireless data network 100, data exchange via file transfer protocol (FTP), hyper text transfer protocol (HTTP) within or outside wireless data network 100, or data exchange via wireless access protocol (WAP) within or outside wireless data network 100, to name a few. Data calls outside wireless network 100 may be via public or private packet-switched or other data networks including the Internet, circuit switched networks such as the public switched telephone network (PSTN), other wireless networks, or any other desired communications infrastructure. Regardless the characteristics of the data call, in general, automated wireless data quality measurement system 102 injects a known data payload into wireless data network 100 and compares the payloads that pass through wireless data network 100 with the original data payload for error rate.

In addition to wireless data quality information, automated wireless data quality measurement system 102 collects engineering performance data for each air interface technology associated with wireless devices 306. For example, automated wireless data quality measurement system 102 may collect data about the electromagnetic signal associated with the channel serving the data call, and, with optional high-speed scanners, about neighboring and control channels. In this manner, automated wireless data quality measurement system 102 may also decode the overhead messaging (Layer 3) that is going on between the calling device and the base station controller and display the messages in a real time via user interface 310.

Navigation system 308 enables automated wireless data quality measurement system 102 to match the information collected during the data call to a particular location with extremely high accuracy. Thus, one of the many possible embodiments of automated wireless data quality measurement system 102 may be used to measure the performance of a single wireless data network 102. In alternative embodiments, automated wireless data quality measurement system 102 may be used to perform either competitive or historical network benchmarking. Network performance can be measured at regular intervals, allowing engineering and management to see the impacts of newly deployed infrastructure and technologies, increased subscriber loads, and changing usage patterns. In these alternative embodiments, automated wireless data quality measurement system 102 enables a single user to benchmark multiple wireless data networks 100 simultaneously and compare the performance of each wireless date network 100 with the other wireless data networks 100.

Figure 4:
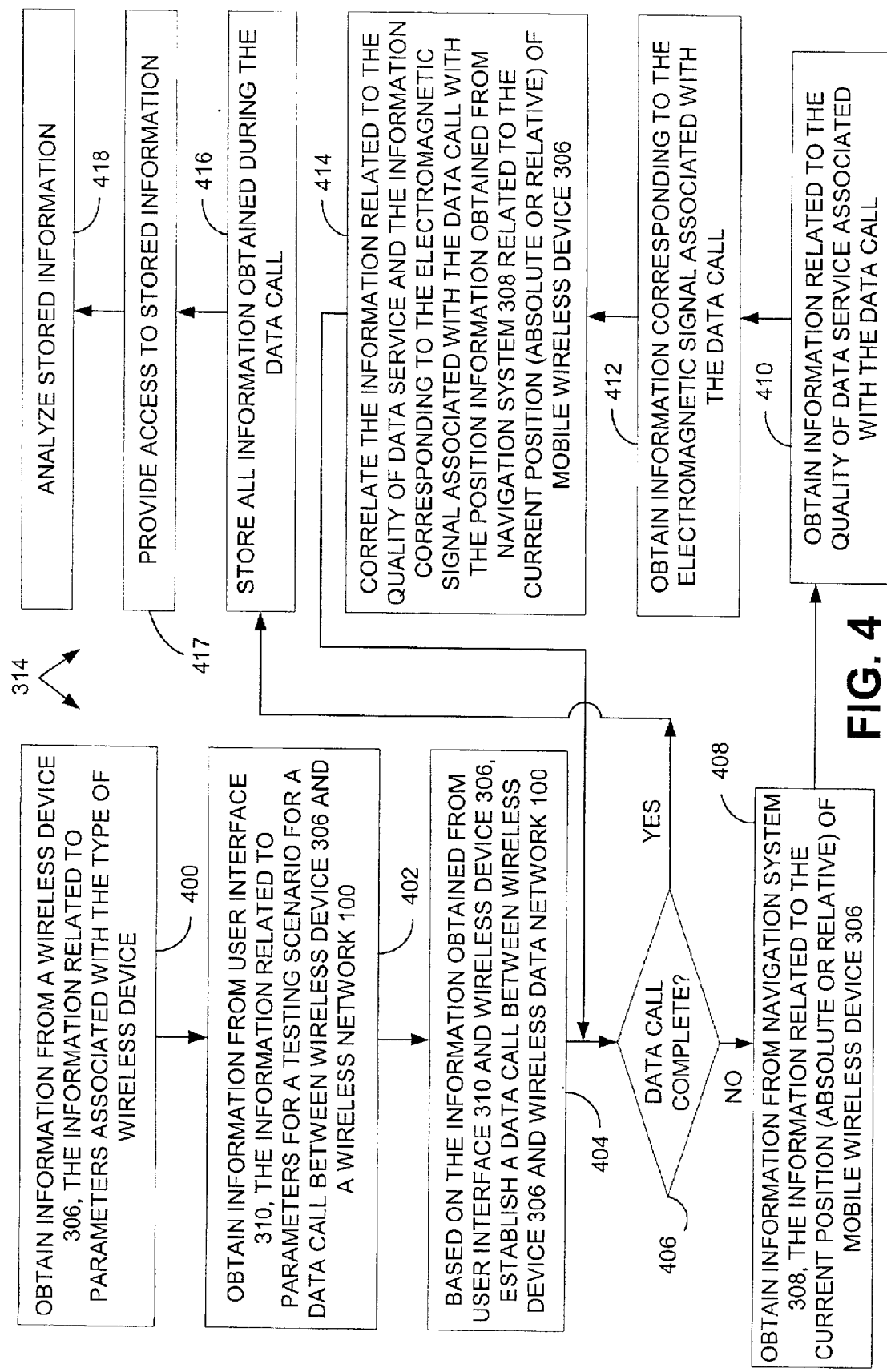
FIG. 4 is a flow chart illustrating the architecture, functionality, and operation of one of a number of possible embodiments of the automated wireless data quality measurement system of FIGS. 1–3.

FIG. 4 is a flow chart illustrating the architecture, functionality, and operation of those embodiments of automated wireless data quality measurement module 314 for measuring the performance of a single wireless data network 100.

At block 400, information may be obtained from a wireless device 306. The information obtained from wireless device 306 may be related to any of a number of parameters associated with the type of wireless device 306. For example, the information obtained from wireless device 306 may be used by automated wireless data quality measurement system 102 to determine the capabilities of wireless device 306. The information may also be used by automated wireless data quality measurement system 102 to configure the characteristics of a data call. This information may include how wireless device 306 initiates a data session, or data call, what types of data transmission, such as WAP, FTP, packet switched, etc., wireless device 306 supports, and additional tracking information related to wireless device 306, such as, for example, a serial number.

At block 402, information may be obtained from user interface 310. The information obtained from user interface 310 may be related to parameters for configuring a testing scenario for a data call between wireless device 306 and wireless data network 100. As described above, automated wireless data quality measurement system 102 measures the quality of service associated with a data call with wireless data network 100. In some embodiments of automated wireless data quality measurement system 102, information is obtained from user interface 310. As described in detail below, this functionality may be used to enable a user to configure the following: (1) the parameters for a testing scenario corresponding to the data call between wireless device 306 and wireless data network 100 and (2) the types of information to collect during the data call. However, there are various other embodiments of automated wireless data quality measurement system 102 which do not employ user interface 310. In such embodiments, the functionality described below is instead predefined in memory 302 in automated wireless data quality module 314.

Figure 5:
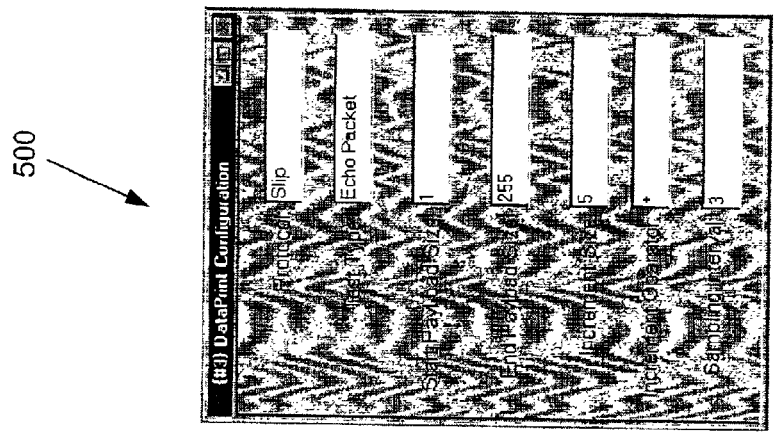
FIG. 5 is a configuration screen generated by a preferred embodiment of the automated wireless data quality measurement system of FIGS. 1–3 and displayed on a preferred embodiment of the user interface of FIG. 3.

FIG. 5 is a configuration screen 500 generated by a preferred embodiment of automated wireless data quality measurement module 314 and displayed on user interface 310. Configuration screen 500 enables a user to define various testing functions associated with the data call. For example, the user may specify either the Serial Line Internet Protocol (SLIP) or Point To Point Protocol (PPP) to be used for the data call. However, it should be understood by those of ordinary skill in the art that various other protocols may be used with automated wireless data quality measurement system 102, such as, for example, WAP, FTP, HTTP or any other desirable data communication protocol. The user may also specify the mode data termination equipment 202 employs to echo the data payload back to automated wireless data quality measurement system 102. This may be done in either packet mode (wait for the entire packet) or character mode (transfer each character as received). Configuration screen 500 also enables a user to define the size of the data payload (# of characters per packet) for a beginning and ending payload size. The user may define how the data payload is to be incremented or decremented in size over the specified data call duration. In addition, the user may define the sampling interval to determine the number of times packets of each size will be sent between automated wireless data quality measurement system 102 and data termination equipment 202 for measuring the average, minimum, and maximum transfer times and transfer errors, before being incremented or decremented to the next size.

Figure 6:
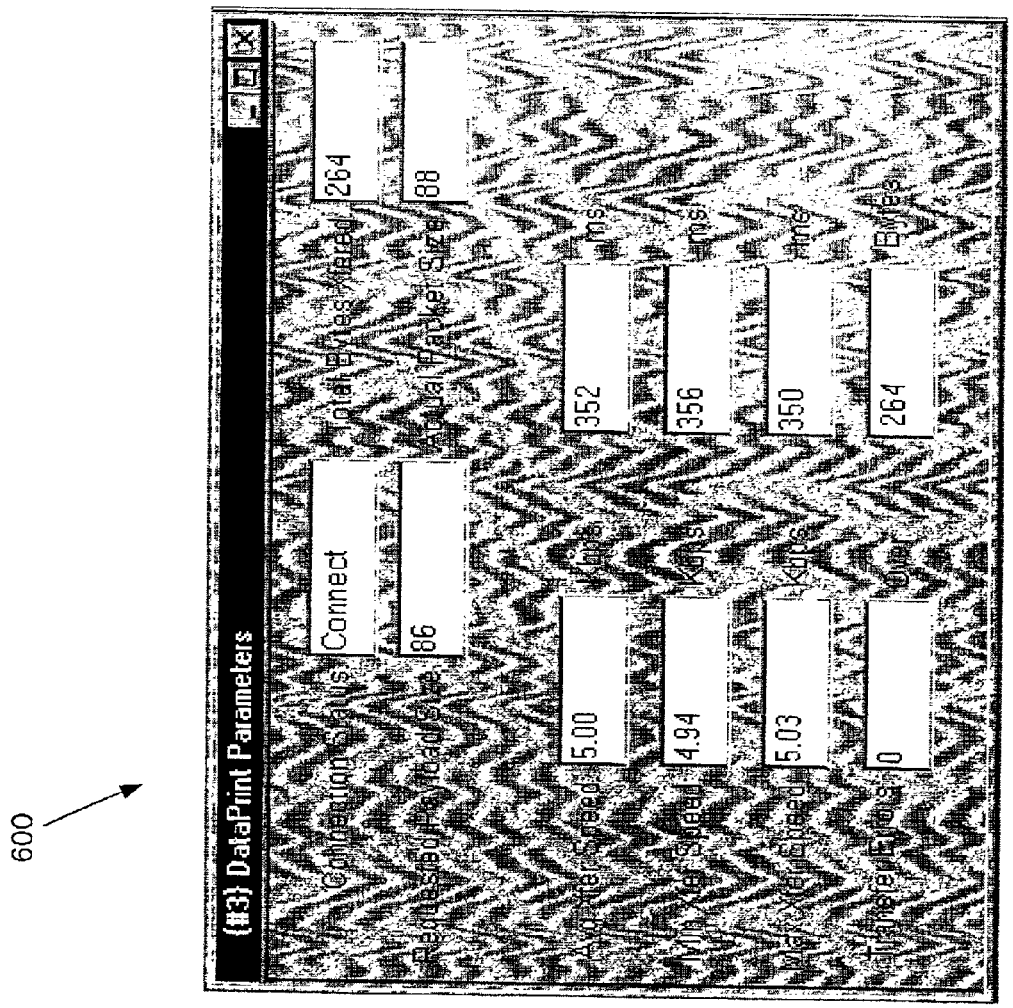
FIG. 6 is a quality of wireless data service screen generated by a preferred embodiment of the automated wireless data quality measurement system of FIGS. 1–3 and displayed on a preferred embodiment of the user interface of FIG. 3.

FIG. 6 is a quality of wireless data service screen 600 generated by a preferred embodiment of automated wireless data quality measurement module 314 and displayed on user interface 310. Quality of wireless data service screen 600 enables a user to view the information related to the quality of data service associated with the data call. For example, a user may view any of the following quality of service parameters: connection status, total bytes transferred, requested payload size, actual packet size, average transfer speed, minimum transfer speed, maximum transfer speed, and transfer errors. Table 1 below shows various exemplary document values for the connection status of the data call.

TABLE 1

| Connection Status |
| --- |
| OK |
| Connect |
| Ring |
| No Carrier |
| Error |
| Connect 1200 |
| No Dial Tone |
| Busy |
| No Answer |
| Connect 2400 |
| Connect 9600 |
| Connect 4800 |
| Connect 7200 |
| Connect 12000 |
| Connect 14400 |
| Connect 16800 |
| Connect 19200 |
| Connect 21600 |
| Connect 24000 |
| Connect 24600 |
| Connect 28000 |

The parameter requested payload size refers to the requested size of the packet that is to be sent from automated wireless data quality measurement system 102 to data termination equipment 202 and back. The parameter actual packet size refers to the actual size of the packet that is sent from automated wireless data quality measurement system 102 to data termination equipment 202 and back. This differs from the requested payload size based on the protocol being used for data transfer. The parameter average transfer time refers to the average transfer speed that will be calculated over all bytes transferred over a predefined number of transfers, where the predefined number is equal to the sampling interval from screenshot 500 of FIG. 5. The parameter maximum transfer time refers to the maximum transfer time recorded over a predefined number of roundtrip packet transfers, where the predefined number equals the sampling interval from screenshot 500 of FIG. 5. The parameter minimum transfer time refers to the minimum transfer time recorded over a predefined number (sampling interval) of roundtrip packet transfers. The parameter total transfer errors refers to the total bytes received in error by automated wireless data quality measurement system 102 over a predefined number of (sampling interval) roundtrip packet transfers. The parameter total bytes transferred refers to the total bytes of data transferred during the data call. It should be understood by those of ordinary skill in the art that various other quality of data service parameters may be employed by automated wireless data quality measurement system 102.

Each of the quality of data service parameters are measured by automated wireless data quality measurement system 102 throughout the data call. In one of many possible embodiments, the systems does not make this measurement based on time, but rather it makes the measurement as packets (payload) are received during the data call. For instance, the number of measurements made is based on how long the call lasts and how many transactions are possible during this time. However, there is nothing to say this measurement can not be made on a time basis as mentioned above. In alternative embodiments, the parameters may be measured continuously or at a desirable interval.

Figure 7:
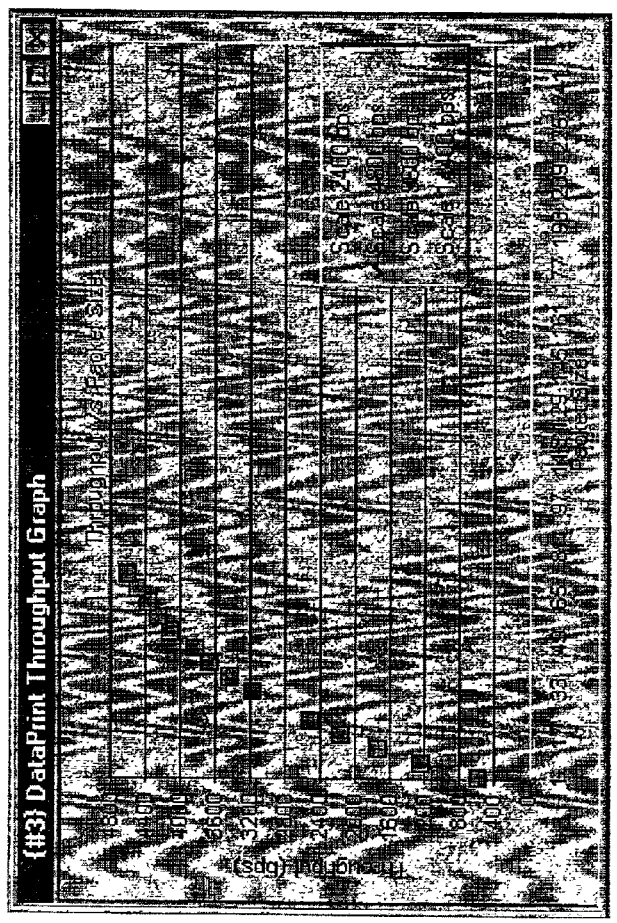
FIG. 7 is a throughput graph screen generated by a preferred embodiment of the automated wireless data quality measurement system of FIGS. 1–3 and displayed on a preferred embodiment of the user interface of FIG. 3.

FIG. 7 is a throughput graph screen 700 generated by a preferred embodiment of automated wireless data quality measurement module 314 and displayed on user interface 310. Throughput graph screen 700 plots the data throughput associated with the data call in bits per second against the packet size. Throughput graph screen 700 enables a user to change the throughput scale between predefined values.

Automated wireless data quality measurement system 102 also enables a user to configure various data collection parameters via user interface 310. For instance, a user may configure various automated tests, as well as configure the information to be collected by automated wireless data quality measurement system 102, such as the information related to the quality of data service associated with the data call and the information corresponding to the electromagnetic signals associated with the data call.

Figure 8:
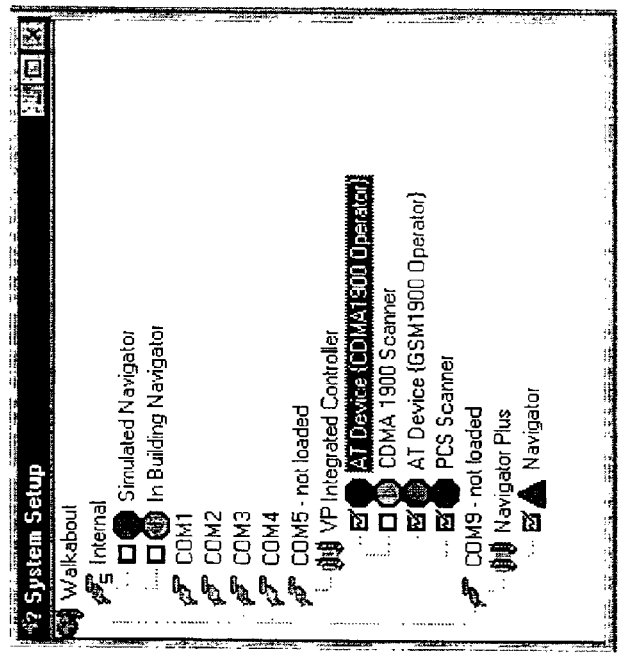
FIG. 8 is a system setup screen generated by a preferred embodiment of the automated wireless data quality measurement system of FIGS. 1–3 and displayed on a preferred embodiment of the user interface of FIG. 3.

FIG. 8 is a system setup screen 800 generated by a preferred embodiment of automated wireless data quality measurement module 314 and displayed on user interface 310. System setup screen enables a user to view and configure various system parameters associated with navigation system 308, wireless devices 306, and data analysis system 312.

Figure 9:
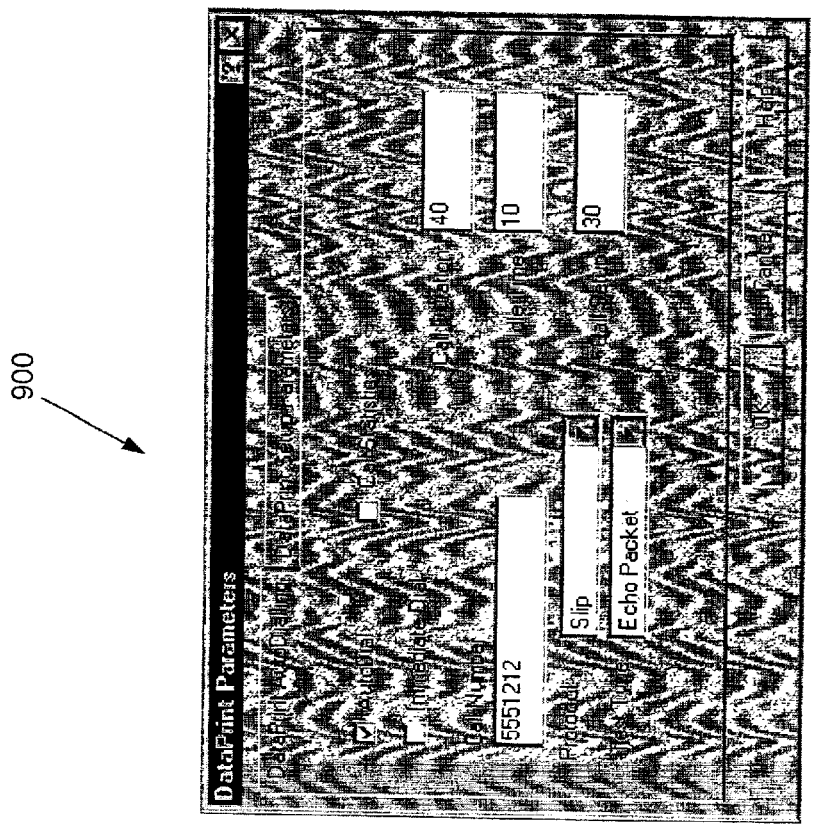
FIG. 9 is an autodialing portion of a setup parameters screen generated by a preferred embodiment of the automated wireless data quality measurement system of FIGS. 1–3 and displayed on a preferred embodiment of the user interface of FIG. 3.

FIG. 9 is an autodialing portion of a setup parameters screen 900 generated by a preferred embodiment of automated wireless data quality measurement module 314 and displayed on user interface 310. The autodialing portion of setup parameters screen 900 enables a user to select an autodialing feature, an immediate dial feature, or a call statistics feature. The user may also configure the call number, the call duration, the idle time, and the call setup, as well as select from a number of protocols and test types as described above (FIG. 5).

Figure 10:
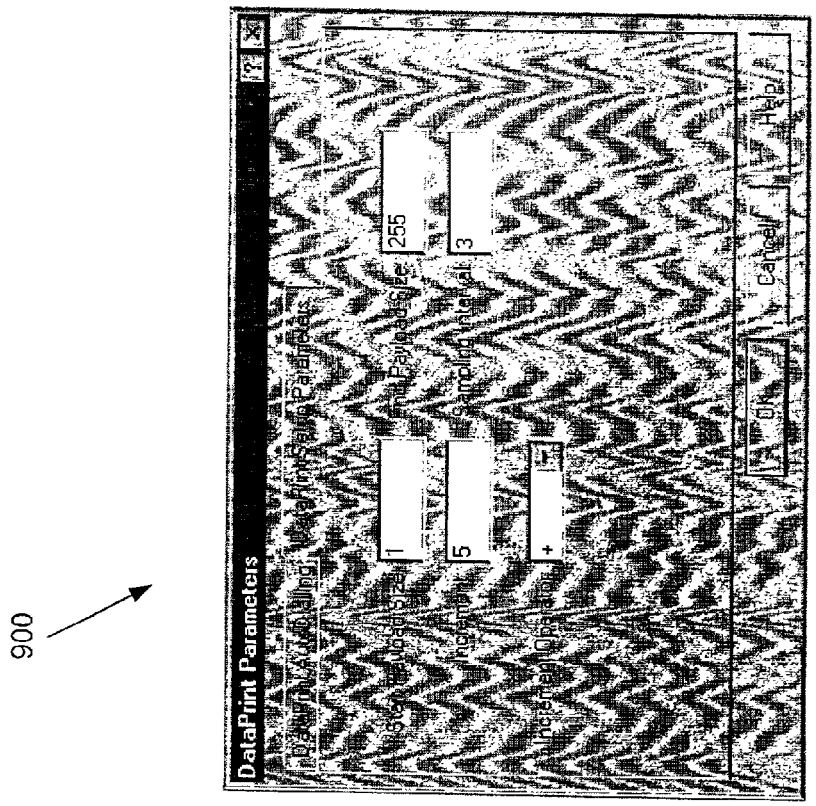
FIG. 10 is a setup parameters portion of the setup parameters screen of FIG. 9.
Figure 12:
FIG. 12 is a survey markers screen generated by a preferred embodiment of the automated wireless data quality measurement system of FIGS. 1–3 and displayed on a preferred embodiment of the user interface of FIG. 3.
Figure 11:
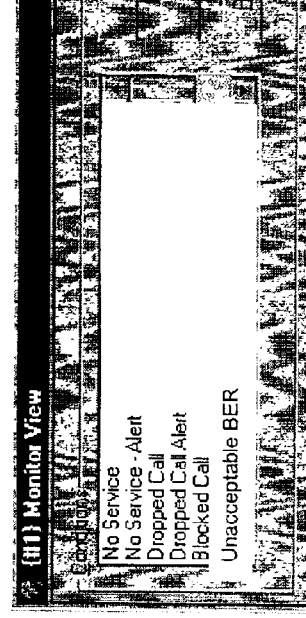
FIG. 11 is a monitor view screen generated by a preferred embodiment of the automated wireless data quality measurement system of FIGS. 1–3 and displayed on a preferred embodiment of the user interface of FIG. 3.

FIG. 10 is a setup parameters portion of setup parameters screen 900 generated by a preferred embodiment of automated wireless data quality measurement module 314 and displayed on user interface 310. The setup parameters portion of setup parameters screen 900 enables a user to configure the start payload size, end payload size, increment amount, sampling interval, and increment operator as described above (FIG. 5). Automated wireless data quality measurement system 102 enables a user to focus on fixing problems, not finding problems. For example, automated wireless data quality measurement system 102 enables a user to automatically flag problems using any of a number of methods, such as by configuring alarms. FIG. 11 is a monitor view screen 1100 generated by a preferred embodiment of automated wireless data quality measurement module 314 and displayed on user interface 310. Monitor view screen 1100 enables a user to set criteria that automated wireless data quality measurement system 102 uses to generate audio alarms or markers. For example, FIG. 12 is a survey markers screen 1200 generated by a preferred embodiment of automated wireless data quality measurement module 314 and displayed on user interface 310. Survey markers screen 1200 enables a user to configure certain adverse quality of data service events, such as, for example, handover, a dropped call, a blocked call, no data service, registration failure, access failure, various types of interference, and handover, or certain other data call events, such as start test, start data collection, stop data collection, and stop test. Automated wireless data quality measurement system 102 may be configured to play an audio clip or insert a marker whenever any of these events occur or when the quality falls below a certain level, a data call is dropped, or the bit error rate exceeds a specified threshold.

Figures 13, 14, 15:
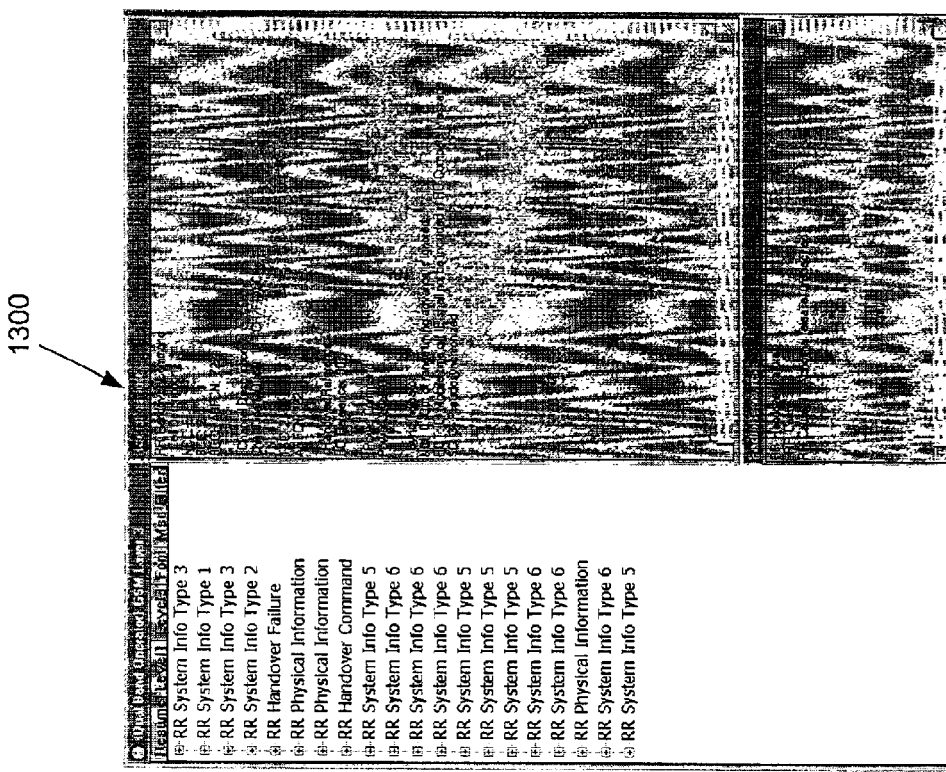
FIG. 13 is a Layer 3 screen generated by a preferred embodiment of the automated wireless data quality measurement system of FIGS. 1–3 and displayed on a preferred embodiment of the user interface of FIG. 3.
FIG. 14 is a signal parameters display screen generated by a preferred embodiment of the automated wireless data quality measurement system of FIGS. 1–3 and displayed on a preferred embodiment of the user interface of FIG. 3.
FIG. 15 is a signal strength display screen generated by a preferred embodiment of the automated wireless data quality measurement system of FIGS. 1–3 and displayed on a preferred embodiment of the user interface of FIG. 3.

Automated wireless data quality measurement system 102 may also enable a user to trap various predefined "Layer 3" messages, such as, for example, failed handovers and other similar network problems, and automatically open a window on user interface 310 illustrating a complete decoding of the message. FIG. 13 shows a Layer 3 screen 1300 that enables this functionality.

Referring again to FIG. 4, at block 404, automated wireless data quality measurement system 102 establishes a data call between wireless device 306 and wireless data network 100. As described above, the characteristics of the data call may be based on any of the information obtained from wireless device 306 and/or user interface 310.

At block 408, information may be obtained from navigation system 308. The information from navigation system 308 may be related to the current absolute or relative position of wireless device 306. At blocks 410, information related to the quality of data service associated with the data call may be collected. Any of the quality of data service parameters described above may be collected.

Figures 16, 17:
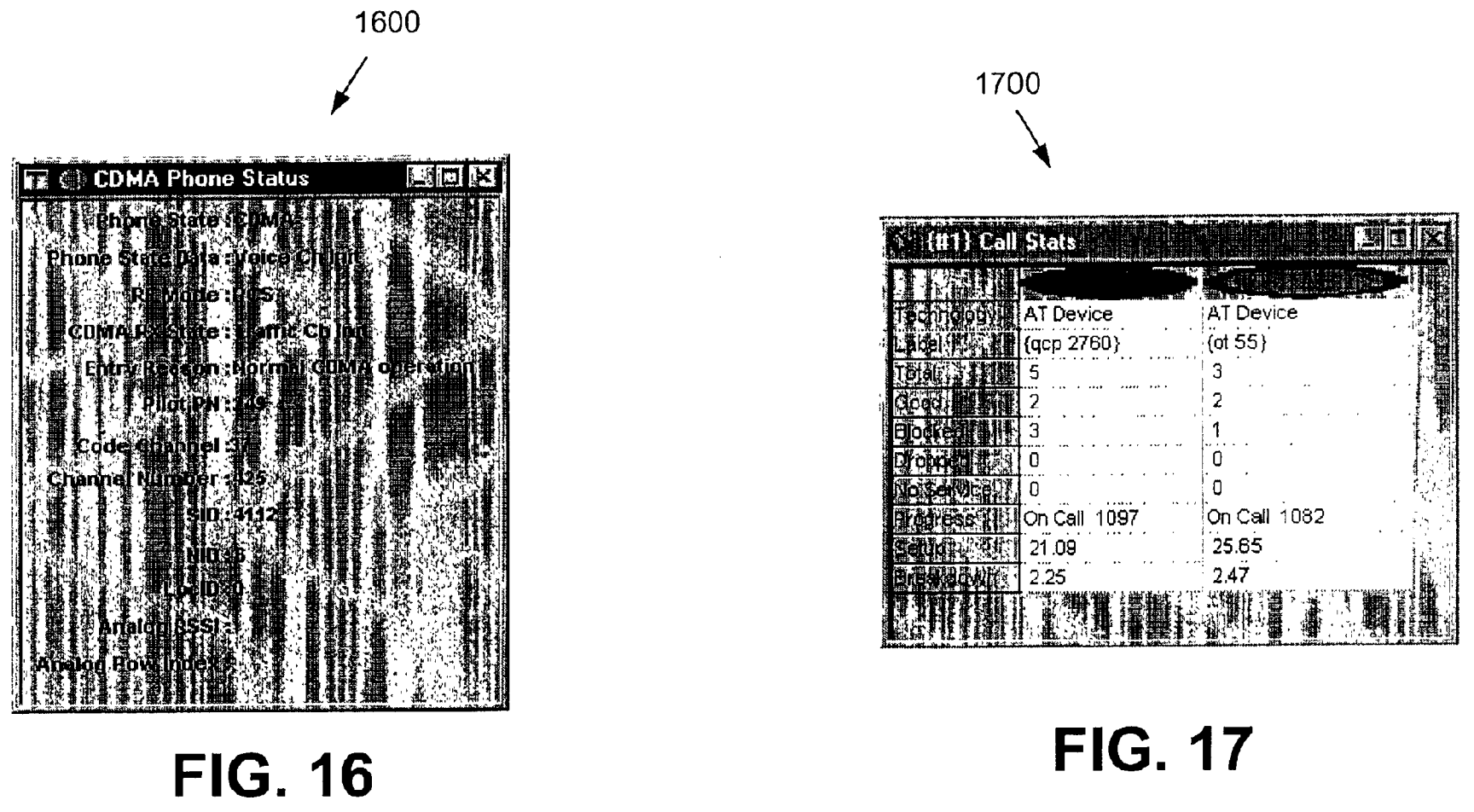

In addition to the quality of data service information, at block 412, information corresponding to the electromagnetic signals associated with the data call may be collected. As shown in FIGS. 14–16, automated wireless data quality measurement system 102 may be configured to display the collected RF information on user interface 310. For example, automated wireless data quality measurement system 102 may collect and display information such as signal strength, transmit power, and bit/frame error rate together with operational fields, such as channel number and identity codes.

At block 414, the information related to the quality of data service and the information corresponding to the electromagnetic signals associated with the data call may be correlated to the position information obtained from navigation system 308. Blocks 408, 410, 412, and 414 may be performed continuously during the data call or at predefined intervals throughout the duration of the data call.

Figure 18:
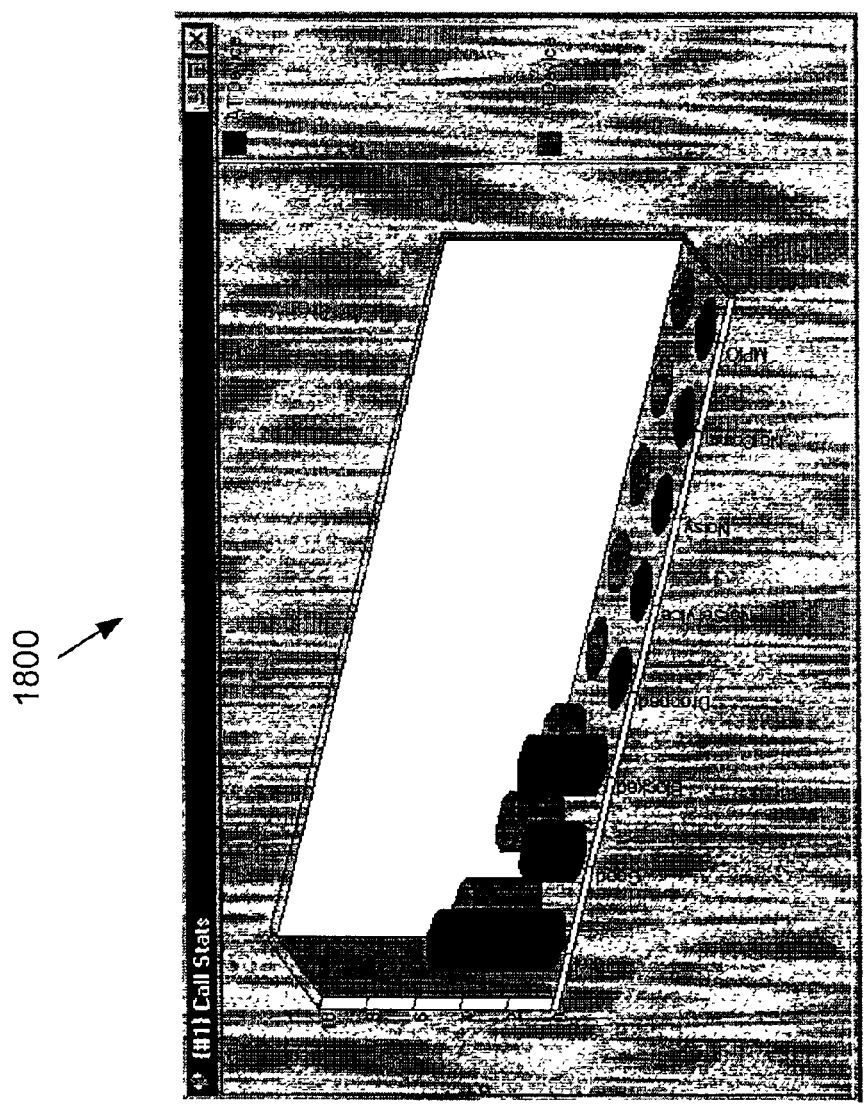
FIG. 18 is a data call statistics graph display screen generated by a preferred embodiment of the automated wireless data quality measurement system of FIGS. 1–3 and displayed on a preferred embodiment of the user interface of FIG. 3.

After the data call is completed, at block 416, the information obtained during the data call may be stored in a database. Automated wireless data quality measurement system 102 may also be configured to display various data call statistics. For example, FIGS. 17 and 18 are data call screens 1700 and 1800, respectively, generated by a preferred embodiment of automated wireless data quality measurement module 314 and displayed on user interface 310. Data call screens 1700 and 1800 may contain information related to various data call statistics including the total number of data calls attempted during a testing scenario, the number of data calls that ended successfully, the number of data calls that did not access a voice channel, the number of data calls that did not end normally, the number of data calls that were not placed because no coverage was available, the duration between data call initiation and placement on a voice channel, the duration between the end of the data call and release of the radio channel by the base station controller 106 (FIG. 1).

Figure 19:
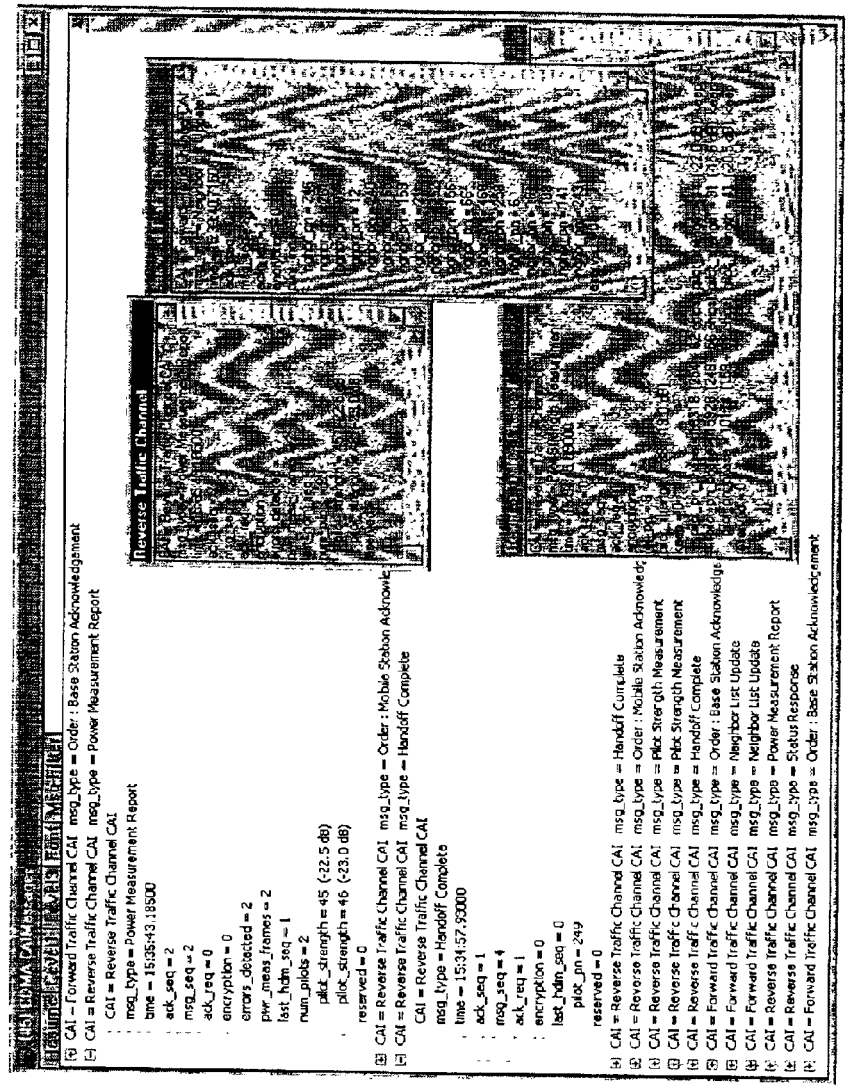
FIG. 19 is a Layer 3 message display screen generated by a preferred embodiment of the automated wireless data quality measurement system of FIGS. 1–3 and displayed on a preferred embodiment of the user interface of FIG. 3.

FIG. 19 is a Layer 3 message display screen 1900 generated by a preferred embodiment of automated wireless data quality measurement module 314 and displayed on user interface 310. Layer 3 message screen 1900 displays the Layer 3 messaging between wireless data network 100 and wireless device 306. These messages may be displayed in a convenient tree diagram. As described above with respect to FIG. 13, during data collection the user may click on any of the higher level messages for a complete decoding.

Figure 20:
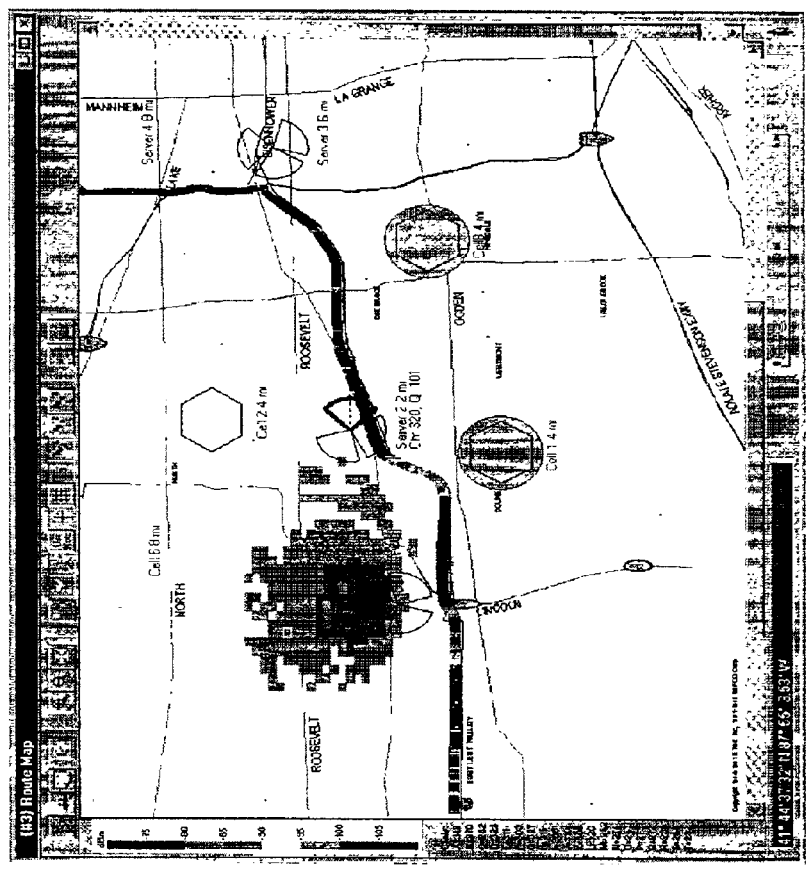
FIG. 20 is a route map screen generated by a preferred embodiment of the automated wireless data quality measurement system of FIGS. 1–3 and displayed on a preferred embodiment of the user interface of FIG. 3.

FIG. 20 is a route map screen 2000 generated by a preferred embodiment of automated wireless data quality measurement module 314 and displayed on user interface 310. Route map screen 2000 shows various user-definable data call events super-imposed on a map underlay of the service area of wireless data network 100. This allows the user to easily visualize the performance of wireless data network 100. Automated wireless data quality measurement system 102 may be configured to show or hide the following layers on route map screen 2000: cell 102 (FIG. 1), a map picture, an ETAK street Map and a map information layer, user notes, survey markers (FIG. 12), a reference grid, the current position of wireless device 306, and a number of predefined data call tracks, which define a planned route within wireless data network 100 for automated wireless data quality measurement system 102 to traverse during a testing scenario.

Referring again to FIG. 4, at block 417, access to the information stored in the database may be provided. Access to the information stored in the database may be performed in a variety of ways. For instance, automated wireless data quality measurement system 102 may be used directly by an operator of a wireless data network 100, or by any other entity desiring to acquire the information collected and provided by automated wireless data quality measurement system 102. In such cases, automated wireless data quality measurement system 102 enables the operator to collect this information and use it in any desirable manner. In alternative embodiments, automated wireless data quality measurement system 102 may be leveraged into a wireless data quality information service offered to any of a number of entities desiring wireless data quality information. For example, the wireless data quality information service may be offered to wireless service providers, operators of wireless data networks, wireless network providers, wireless network hardware providers, wireless device vendors, and telephone companies. For example, automated wireless data quality measurement system 102 may be used by a service provider to collect the information described above and below for numerous wireless data networks 100. Then, the wireless data quality service provider may merely provide the information to an operator of a wireless data network. This may be advantageous to operators of wireless data networks 100 because they can merely pay for the information instead of having to purchase a commercial embodiment of automated wireless data quality measurement system 102. It also eliminates the expense associated with acquiring the information by time consuming creation and implementation of various testing scenarios.

Figure 21:
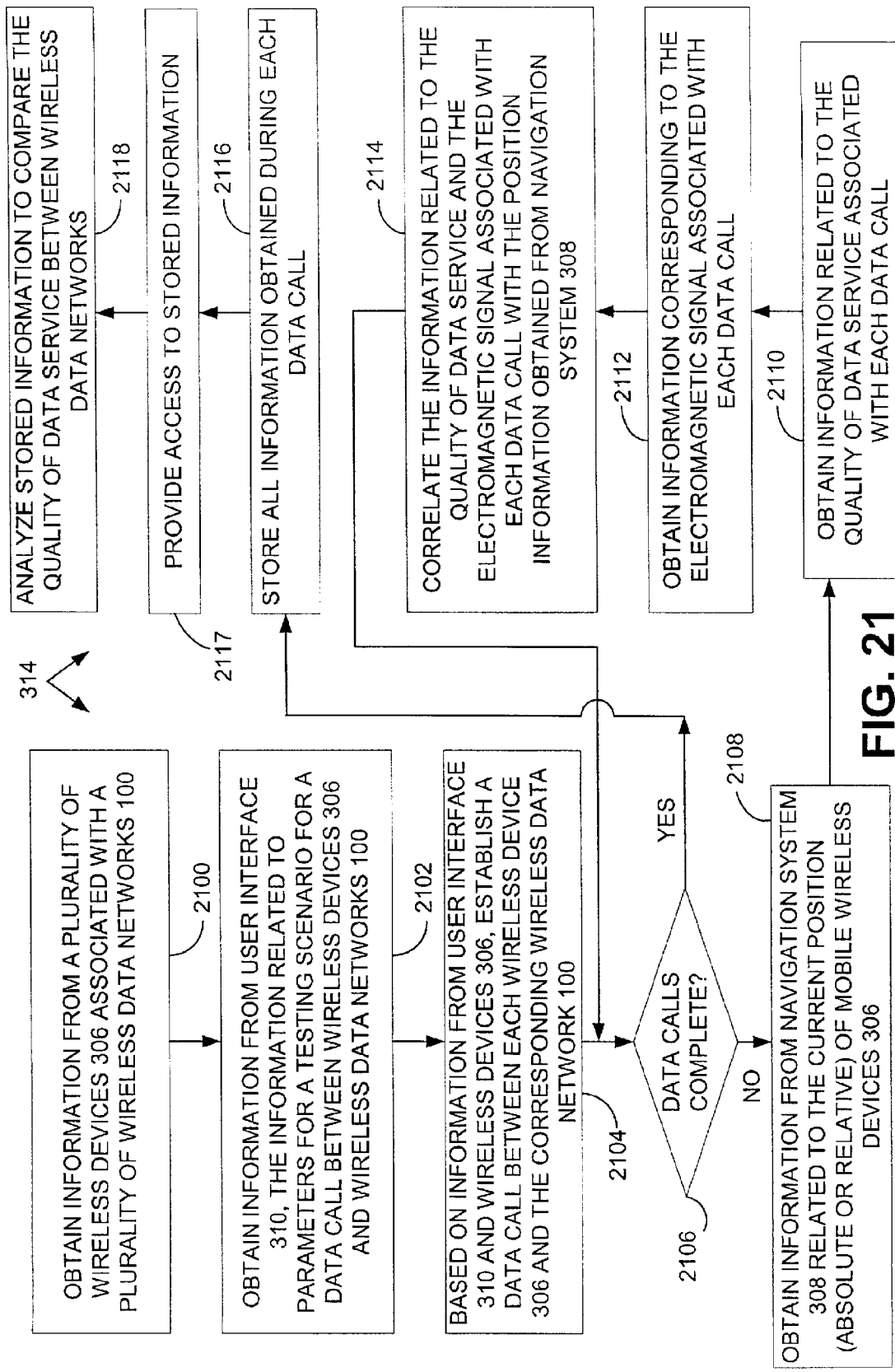
FIG. 21 is a flow chart illustrating the architecture, functionality, and operation of another of a number of possible embodiments of the automated wireless data quality measurement system of FIGS. 1–3.

Wireless data quality information services may be provided in a variety of ways. The wireless data quality information may be offered for sale in traditional business channels. In alternative embodiments, the wireless data quality information may be leveraged into an electronic commerce platform as is well known in the art. The information collected by automated wireless data quality measurement system 102 may be stored in a database in communication with the electronic commerce platform. Consumers, such as operators of wireless data networks 100, may access and purchase the wireless data quality information from the electronic commerce platform via public or private packet-switched or other data networks including the Internet, circuit switched networks such as the public switched telephone network (PSTN), other wireless networks, or any other desired communications infrastructure. At block 418, automated wireless data quality measurement system 102 may be configured to analyze the information stored in database 316. As stated above, in alternative embodiments of automated wireless data quality measurement system 102, the information contained in the database may be provided directly to an external data analysis system. Various data analysis methods may be employed by automated wireless data quality measurement system 102. For example, the data analysis may be directed at providing operators of wireless data networks 100 with meaningful information that may be used to evaluate satisfaction of mobile subscribers, to evaluate the arrangement, size, and location of existing cells 102 and/or transceivers 108, and to verify improvements in wireless data network 100. It should be understood by those of ordinary skill in the art that automated wireless data quality measurement system 102 may also be configured to perform any of a variety of other data analyses. For example, these data analyses may include troubleshooting problem areas in the networks or comparison measurements that are made to evaluate various hardware. FIG. 21 is a flow chart illustrating the architecture, functionality, and operation of alternative embodiments of automated wireless data quality measurement module 314 for comparing the performance of multiple wireless data networks 100 using multiple wireless devices 306. At block 2100, information may be obtained from multiple wireless devices 306. At block 2102, information may be obtained from user interface 310. At block 2104, automated wireless data quality measurement system 102 establishes data calls between each wireless device 306 and the corresponding wireless data network 100. At block 2108, information may be obtained from navigation system 308. At blocks 2110 at 2112, information related to the quality of data service associated with each data call and information related to the electromagnetic signals associated with each data call may be collected. At block 2114, the information related to the quality of data service and the information corresponding to the electromagnetic signals associated with each data call may be correlated to the position information obtained from navigation system 308. At block 2116, the information obtained during each data call may be stored in database 316. At block 2117, access to the information stored in database 316 may be provided. At block 2118, automated wireless data quality measurement system 102 may be configured to analyze the information stored in database 316 to compare the quality of data service between each wireless data network 100.

The information obtained from multiple wireless devices 306, user interface 310, and navigation system 308 may be similar to the corresponding information discussed above with respect to FIG. 4. Furthermore, the description corresponding to FIG. 4 is also equally applicable to FIG. 21.

Any process descriptions or blocks in FIGS. 4 and 21 should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art. In addition, automated wireless data quality measurement module 314, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of automated wireless data quality measurement system 102, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and protected by the following claims.

Therefore, having thus described the invention, at least the following is claimed:

1. A method for comparing the data performance of a first wireless data network to the data performance of a second wireless data network, comprising:

obtaining information related to a location of a first mobile wireless device associated with the first wireless data network and a second mobile wireless device associated with the second wireless data network;

establishing a first data call between the first mobile wireless device and the first wireless data network and a second data call between the second mobile wireless device and the second wireless data network, the first and second data calls based on a predefined testing scenario;

obtaining information related to the quality of data service associated with the first and second data calls; and correlating the information related to the quality of data service associated with the first and second data calls with the information related to the location of the first and second mobile wireless devices.

2. The method of claim 1, further comprising obtaining information corresponding to the electromagnetic signals associated with the first and second data calls and correlating the information corresponding to the electromagnetic signals with the information related to the location of the first and second mobile wireless devices.

3. The method of claim 1, further comprising storing the information related to the quality of data service associated with the first and second data calls, the information related to the location of the first and second mobile wireless devices, and the information corresponding to the correlation of the information related to the quality of data service associated with the first and second data calls with the information related to the location of the first and second mobile wireless devices.

4. The method of claim 3, further comprising providing access to the stored information.

5. The method of claim 1, further comprising comparing the correlated information related to the quality of data service associated with the first data call with the correlated information related to the quality of data service associated with the second data call.

6. The method of claim 5, further comprising providing access to the comparison information.

7. The method of claim 6, further comprising receiving payment for providing the comparison information.

8. The method of claim 1, wherein the establishing a first data call between the first mobile wireless device and the first wireless data network and a second data call between the second mobile wireless device and the second wireless data network involves data messaging.

9. The method of claim 1, wherein the establishing a first data call between the first mobile wireless device and the first wireless data network and a second data call between the second mobile wireless device and the second wireless data network involves web browsing.

10. The method of claim 1, wherein the establishing a first data call between the first mobile wireless device and the first wireless data network and a second data call between the second mobile wireless device and the second wireless data network involves file transfer protocol.

11. The method of claim 1, wherein the establishing a first data call between the first mobile wireless device and the first wireless data network and a second data call between the second mobile wireless device and the second wireless data network involves wireless access protocol.

12. The method of claim 1, wherein the obtaining information comprises obtaining information related to a location of a first wireless telephone associated with the first wireless data network and a second wireless telephone associated with the second wireless data.

13. The method of claim 1, wherein the first wireless data network and the second wireless data network are individually selected from a group of wireless data networks consisting of a code division multiple access based (CDMA) network, a groupe special mobile (GSM) network, a general packet radio service (GPRS) network, an Integrated Dispatch Enhanced Network (iDEN), or a wideband code division multiple access (WCDMA) network.

14. The method of claim 1, wherein the obtaining information related to a location of a first mobile wireless device and a second mobile wireless device, the obtaining information related to the quality of data service associated with the first and second data calls, and the correlating the information related to the quality of data service associated with the first and second data calls with the information related to the location of the first and second mobile wireless devices are performed at intervals during the first and second data calls as the location of the first and second mobile wireless devices changes.

15. The method of claim 1, further comprising, before the establishing a first data call between the first mobile wireless device and the first wireless data network and a second data call between the second mobile wireless device and the second wireless data network, receiving information associated with the predefined testing scenario.

16. A system for comparing the data performance of a first wireless data network to the data performance of a second wireless data network, comprising:

a means for obtaining information related to a location of a first mobile wireless device associated with the first wireless data network and a second mobile wireless device associated with the second wireless data network;

a means for establishing a first data call between the first mobile wireless device and the first wireless data network and a second data call between the second mobile wireless device and the second wireless data network, the first and second data calls based on a predefined testing scenario;

a means for obtaining information related to the quality of data service associated with the first and second data calls; and a means for correlating the information related to the quality of data service associated with the first and second data calls with the information related to the location of the first and second mobile wireless devices.

17. The system of claim 16, further comprising a means for obtaining information corresponding to the electromagnetic signals associated with the first and second data calls and the means for correlating the information corresponding to the electromagnetic signals with the information related to the location of the first and second mobile wireless devices.

18. The system of claim 16, further comprising a means for storing the information related to the quality of data service associated with the first and second data calls, the information related to the location of the first and second mobile wireless devices, and the information corresponding to the correlation of the information related to the quality of data service associated with the first and second data calls with the information related to the location of the first and second mobile wireless devices.

19. The system of claim 18, further comprising a means for providing access to the stored information.

20. The system of claim 16, further comprising a means for comparing the correlated information related to the quality of data service associated with the first data call with the correlated information related to the quality of data service associated with the second data call.

21. The system of claim 20, further comprising a means for providing access to the comparison information.

22. The system of claim 21, further comprising a means for receiving payment for providing the comparison information.

23. The system of claim 16, wherein the means for establishing a first data call between the first mobile wireless device and the first wireless data network and a second data call between the second mobile wireless device and the second wireless data network involves data messaging.

24. The system of claim 16, wherein the means for establishing a first data call between the first mobile wireless device and the first wireless data network and a second data call between the second mobile wireless device and the second wireless data network involves web browsing.

25. The system of claim 16, wherein the means for establishing a first data call between the first mobile wireless device and the first wireless data network and a second data call between the second mobile wireless device and the second wireless data network involves file transfer protocol.

26. The system of claim 16, wherein the means for establishing a first data call between the first mobile wireless device and the first wireless data network and a second data call between the second mobile wireless device and the second wireless data network involves wireless access protocol.

27. The system of claim 16, wherein the first and second mobile wireless devices are a wireless telephone.

28. The system of claim 16, wherein the first wireless data network and the second wireless data network are individually selected from a group of wireless data networks consisting of a code division multiple access (CDMA) based network, a groupe special mobile (GSM) network, an Integrated Dispatch Enhanced Network (iDEN), a general packet radio service (GPRS) network, or a wideband code division multiple access (WCDMA) network.

29. The system of claim 16, wherein the means for obtaining information related to a location of a first mobile wireless device and a second mobile wireless device, the means for establishing a first data call between the first mobile wireless device and the first wireless data network and a second data call between the second mobile wireless device and the second wireless data network, the means for obtaining information related to the quality of data service associated with the first and second data calls, and the means for correlating the information related to the quality of data service associated with the first and second data calls with the information related to the location of the first and second mobile wireless devices are coupled to an automobile.

30. The system of claim 16, wherein the means for obtaining information related to a location of a first mobile wireless device and a second mobile wireless device, the means for establishing a first data call between the first mobile wireless device and the first wireless data network and a second data call between the second mobile wireless device and the second wireless data network, the means for obtaining information related to the quality of data service associated with the first and second data calls, and the means for correlating the information related to the quality of data service associated with the first and second data calls with the information related to the location of the first and second mobile wireless devices are coupled to a portable carrying device adapted to be carried by a person.

31. The system of claim 16, further comprising a means for receiving information associated with the predefined testing scenario.

32. A system for comparing the performance of a first wireless data network to a second wireless data network, comprising:

a processor responsive to instructions; and a memory in communication with said processor, said memory containing instructions configured to direct the processor to:

obtain information related to a location of a first mobile wireless device associated with the first wireless data network and a second mobile wireless device associated with the second wireless data network;

establish a first data call between the first mobile wireless device and the first wireless data network and a second data call between the second mobile wireless device and the second wireless data network, the first and second data calls based on a predefined testing scenario;

obtain information related to the quality of data service associated with the first and second data calls; and correlate the information related to the quality of data service associated with the first and second data calls with the information related to the location of the first and second mobile wireless devices.

33. The system of claim 32, further comprising:

a navigation system in communication with the processor, the navigation system configured to determine the position of the first and second mobile wireless devices.

34. The system of claim 33, further comprising a user interface in communication with the processor, the user interface configured to enable a user to view the information related to the location of the first and second mobile wireless device within the first and second wireless data networks and the information related to the quality of data services associated with the first and second data calls.

35. The system of claim 34, wherein the user interface is further configured to enable the user to define the kind of information related to the location of the first and second mobile wireless devices provided by the navigation system and the kind of information related to the quality of data service which is obtained during the first and second data calls.

36. A computer-readable medium having stored thereon an executable instruction set, the instruction set, when executed by a processor, directs the processor to perform a method for comparing the data performance of a first wireless data network to the data performance of a second wireless data network, the method comprising:

obtaining information related to a location of a first mobile wireless device associated with the first wireless data network and a second mobile wireless device associated with the second wireless data network;

establishing a first data call between the first mobile wireless device and the first wireless data network and a second data call between the second mobile wireless device and the second wireless data network, the first and second data calls based on a predefined testing scenario;

obtaining information related to the quality of data service associated with the first and second data calls; and correlating the information related to the quality of data service associated with the first and second data calls with the information related to the location of the first and second mobile wireless devices.

37. The computer-readable medium of claim 36, further comprising logic configured to obtain information corresponding to the electromagnetic signals associated with the first and second data calls and correlating the information corresponding to the electromagnetic signals with the information related to the location of the first and second mobile wireless devices.

38. The computer-readable medium of claim 36, further comprising logic configured to store the information related to the quality of data service associated with the first and second data calls, the information related to the location of the first and second mobile wireless devices, and the information corresponding to the correlation of the information related to the quality of data service associated with the first and second data calls with the information related to the location of the first and second mobile wireless devices.

39. The computer-readable medium of claim 38, further comprising logic configured to provide access to the stored information.

40. The computer-readable medium of claim 36, further comprising logic configured to compare the correlated information related to the quality of data service associated with the first data call with the correlated information related to the quality of data service associated with the second data call.

41. The computer-readable medium of claim 40, further comprising logic configured to provide access to the comparison information.

42. The computer-readable medium of claim 41, further comprising logic configured to receive payment for providing the comparison information.

* * * * *